United States Patent
Yeh

(10) Patent No.: US 8,259,091 B2
(45) Date of Patent: Sep. 4, 2012

(54) HANDHELD ELECTRONIC DEVICE

(75) Inventor: Chien-cheng Yeh, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 1196 days.

(21) Appl. No.: 12/056,285

(22) Filed: Mar. 27, 2008

(65) Prior Publication Data

US 2009/0146974 A1    Jun. 11, 2009

(30) Foreign Application Priority Data

Dec. 6, 2007    (TW) .................................. 96146586 A

(51) Int. Cl.
  *G06F 3/033*    (2006.01)
(52) U.S. Cl. .................................. 345/179; 178/19.01
(58) Field of Classification Search ............. 361/679.55, 361/679.56, 679.3, 679.4–679.45; 178/18.01–20.04; D19/54–55; 345/156, 168, 169, 179; 455/556.1, 455/556.2, 575.1
See application file for complete search history.

(56) References Cited

U.S. PATENT DOCUMENTS

| | | | |
|---|---|---|---|
| 4,594,548 A | | 6/1986 | Takahashi et al. |
| 4,643,604 A | * | 2/1987 | Enrico ........................ 401/131 |
| 5,067,573 A | | 11/1991 | Uchida |
| 5,635,959 A | | 6/1997 | Takeuchi et al. |
| 5,649,463 A | | 7/1997 | Lindee et al. |
| 5,750,939 A | | 5/1998 | Makinwa et al. |
| 5,844,543 A | | 12/1998 | Tamura et al. |
| 6,114,958 A | | 9/2000 | Murphy |
| 6,681,333 B1 | | 1/2004 | Cho |
| 6,924,791 B1 | | 8/2005 | Nicolas et al. |
| 7,023,430 B2 | * | 4/2006 | Liu et al. ........................ 345/179 |
| 7,046,237 B1 | | 5/2006 | Nicolas et al. |
| 7,249,521 B1 | * | 7/2007 | Frasca ............................ 73/799 |
| 7,626,582 B1 | | 12/2009 | Nicolas et al. |
| 2001/0020455 A1 | | 9/2001 | Schifferl |
| 2002/0103616 A1 | | 8/2002 | Park et al. |
| 2002/0190823 A1 | * | 12/2002 | Yap .............................. 335/205 |
| 2003/0128193 A1 | * | 7/2003 | Huang et al. .................. 345/173 |
| 2004/0212604 A1 | | 10/2004 | Ong |
| 2007/0012683 A1 | * | 1/2007 | Boege et al. .................. 219/601 |

FOREIGN PATENT DOCUMENTS

| | | |
|---|---|---|
| CN | 2502312 Y | 7/2007 |
| JP | 2004-311192 | 11/2004 |
| TW | 495088 | 7/2002 |
| TW | 514940 | 12/2002 |

(Continued)

OTHER PUBLICATIONS

"First Office Action of China Counterpart Application", issued on Aug. 3, 2010, p. 1-p. 6, in which the listed reference was cited.

(Continued)

*Primary Examiner* — Stephen Sherman
(74) *Attorney, Agent, or Firm* — Jianq Chyun IP Office

(57) ABSTRACT

A handheld electronic device including a main body, a first magnetic member and a stylus is provided. The main body has a containing slot and the first magnetic member is disposed at one side of the containing slot. The stylus is suitable for being inserted in the containing slot and includes a stylus body and a second magnetic member. The second magnetic member is disposed on the stylus body or embedded in the stylus body. When the stylus is contained within the containing slot, the stylus is kept within the containing slot due to magnetic force generated by the first magnetic member and the second magnetic member.

12 Claims, 3 Drawing Sheets

FOREIGN PATENT DOCUMENTS

| | | |
|---|---|---|
| TW | 547691 | 8/2003 |
| TW | M260799 | 4/2005 |
| TW | 200537354 | 11/2005 |
| TW | 200612236 | 4/2006 |
| TW | M295766 | 8/2006 |

OTHER PUBLICATIONS

"Office Action of Taiwan Counterpart Application", issued on Nov. 11, 2010, p. 1-p. 8, in which the listed references were cited.

"First Office Action of China Counterpart Application," issued on Aug. 3, 2010, p. 1-p. 6, in which US20020190823 was cited.

"Office Action of Taiwan Counterpart Application," issued on Nov. 11, 2010, p. 1-p. 8, in which TW547691, TWM260799, and TWM295766 were cited.

"First Office Action of China Counterpart Application," issued on Aug. 28, 2009, p. 1-p. 6, in which US20020103616 was cited.

"Office Action of Taiwan Counterpart Application," issued on Nov. 16, 2010, p. 1-p. 4, in which TW200612236 was cited.

"First Office Action of U.S. Co-pending Application," issued on May 29, 2008, p. 1-p. 12, in which US20020103616, US4594548, and US5649463 were cited.

"Office Action of Taiwan Counterpart Application," issued on Apr. 8, 2011, p. 1-p. 4, in which TW200537354, JP2004-311192, and TW514940 were cited.

"Office Action of Taiwan Counterpart Application," issued on Apr. 7, 2011, p. 1-p. 4, in which TW495088, TW200537354 and TW200612236 were cited.

"First Office Action of U.S. Co-pending Application," issued on Apr. 3, 2008, p. 1-p. 12, in which US5067573,TW495088, US6114958, US6924791, US6681333, US7626582, and US7046237 were cited.

"First Office Action of China Counterpart Application," issued on Jan. 15, 2010, in which CN2502312Y, US5067573, and US5635959 were cited.

"Final Office Action of America Co-pending Application (U.S. Appl. No. 12/061,660)", issued on Jul. 18, 2011, p. 1-p. 16, in which US5844543 was cited.

"Office Action of America Co-pending Application (U.S. Appl. No. 12/061,660) after RCE", issued on Nov. 10, 2011, p. 1-p. 14.

"Final Office Action of America Co-pending Application (U.S. Appl. No. 12/129,618)", issued on Aug. 31, 2011, p. 1-p. 14, in which US5750939 was cited.

"Office Action of America Co-pending Application (U.S. Appl. No. 12/129,618) after RCE", issued on Feb. 3, 2012, p. 1-p. 14, in which US20010020455 was cited.

* cited by examiner

HANDHELD ELECTRONIC DEVICE

CROSS-REFERENCE TO RELATED APPLICATION

This application claims the priority benefit of Taiwan application serial no. 96146586, filed on Dec. 6, 2007. The entirety of the above-mentioned patent application is hereby incorporated by reference herein and made a part of this specification.

BACKGROUND OF THE INVENTION

1. Field of the Invention

The present invention relates to a handheld electronic device. More particularly, the present invention relates to a handheld electronic device having a stylus.

2. Description of Related Art

With development of technology, electronic products have become indispensable in our daily life. To cope with a demanding of high working frequency, high efficiency, and features of lightness, slimness, shortness and smallness of the electronic products, utilization of various handheld electronic devices such as ultra mobile personal computer (UMPC), tablet PC, pocket PC, personal digital assistant (PDA) and mobile phone etc. is increasing.

Presently, touch screen which may simultaneously provide an input interface and a display interface is applied to a part of the handheld electronic devices (such as PDAs) in the market. Therefore, the handheld electronic devices may not only have a feature of displaying a relatively large image, but also have the feature of small size. Moreover, the handheld electronic device may further have a stylus utilized in coordination with the touch screen, such that a user may input characters or select functions displayed on the screen via the stylus, so as to implement various built-in functions of the handheld electronic device.

In a conventional technique, main body of the handheld electronic device generally has a containing slot for housing the stylus, and the stylus may be locked in the containing slot based on a lock-in structure. However, such conventional lock-in structure may be worn and malfunction after a long time utilization, such that the stylus cannot be stably locked within the containing slot. In other words, the stylus may easily fall out from the handheld electronic device.

SUMMARY OF THE INVENTION

The present invention is directed to a handheld electronic device, in which combination of a stylus and a main body thereof has a preferred reliability, and the stylus may be stably locked in the main body.

The present invention provides a handheld electronic device including a main body, a first magnetic member and a stylus. The main body has a containing slot and the first magnetic member is disposed at one side of the containing slot. The stylus is suitable for being inserted into the containing slot and includes a stylus body and a second magnetic member. The second magnetic member is disposed on the stylus body or embedded in the stylus body. When the stylus is contained within the containing slot, the stylus is kept in the containing slot due to magnetic force generated by the first magnetic member and the second magnetic member.

The present invention further provides a stylus, which is suitable for being inserted into a containing slot of a handheld electronic device. The stylus includes a stylus body and a second magnetic member. The handheld electronic device has a first magnetic member disposed at one side of the containing slot. The second magnetic member is disposed on the stylus body or embedded in the stylus body. When the stylus is contained within the containing slot, the stylus is kept within the containing slot due to magnetic force generated by the first magnetic member and the second magnetic member.

In the present invention, the stylus may be kept within the containing slot due to magnetic force generated by two magnetic members, so as to substitute a lock-in structure of a conventional technique. Therefore, the present invention may solve the problem of worn out and malfunction of the conventional lock-in structure after a long time utilization, such that the stylus may be stably kept in the main body of the handheld electronic device, and utilization reliability of the handheld electronic device may be improved accordingly.

In order to make the aforementioned and other features and advantages of the present invention comprehensible, a preferred embodiment accompanied with figures is described in detail below.

DESCRIPTION OF EMBODIMENTS

Figure 1:
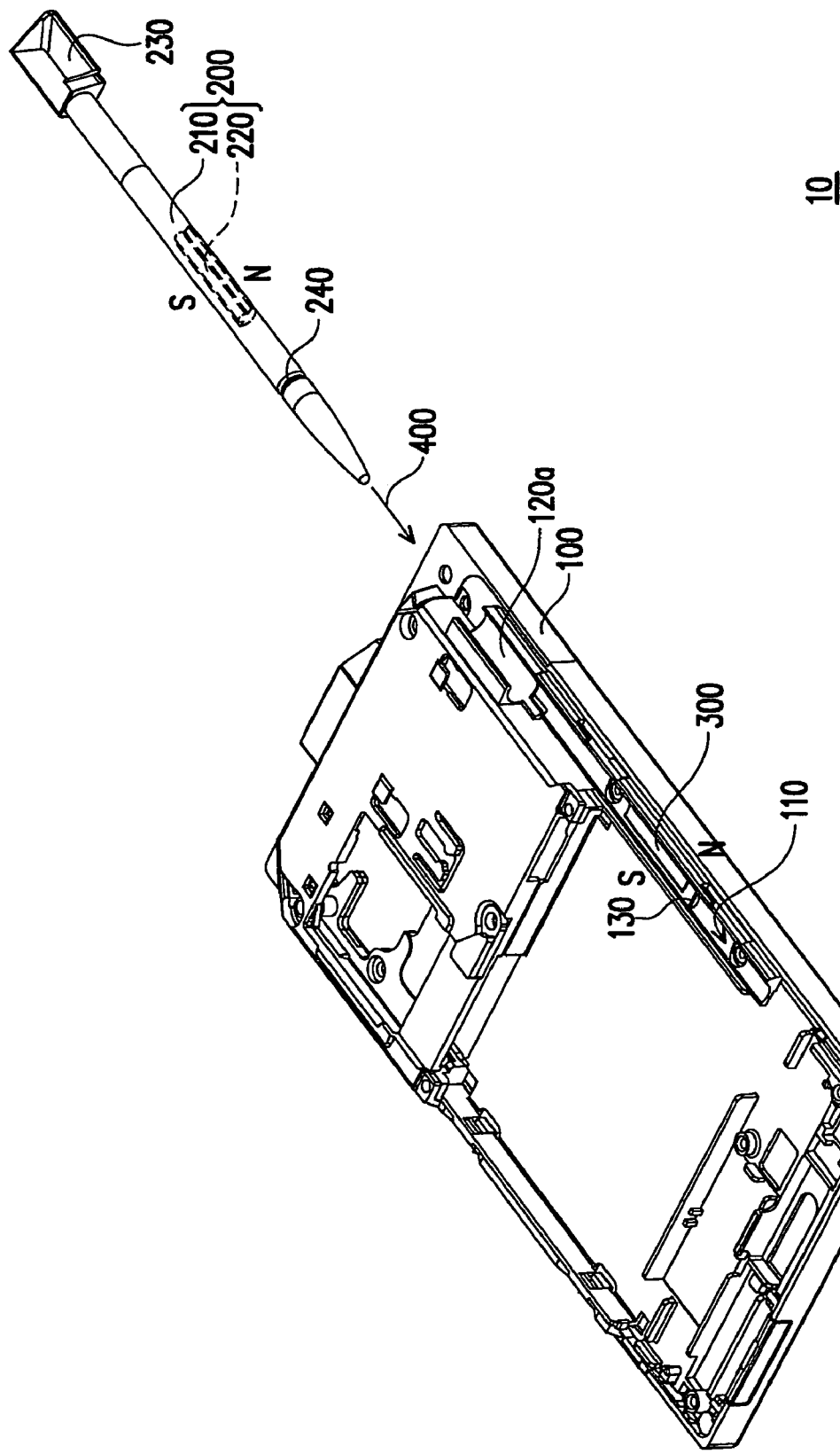
FIG. 1 is a perspective view of a handheld electronic device according to an embodiment of the present invention.
Figure 2:
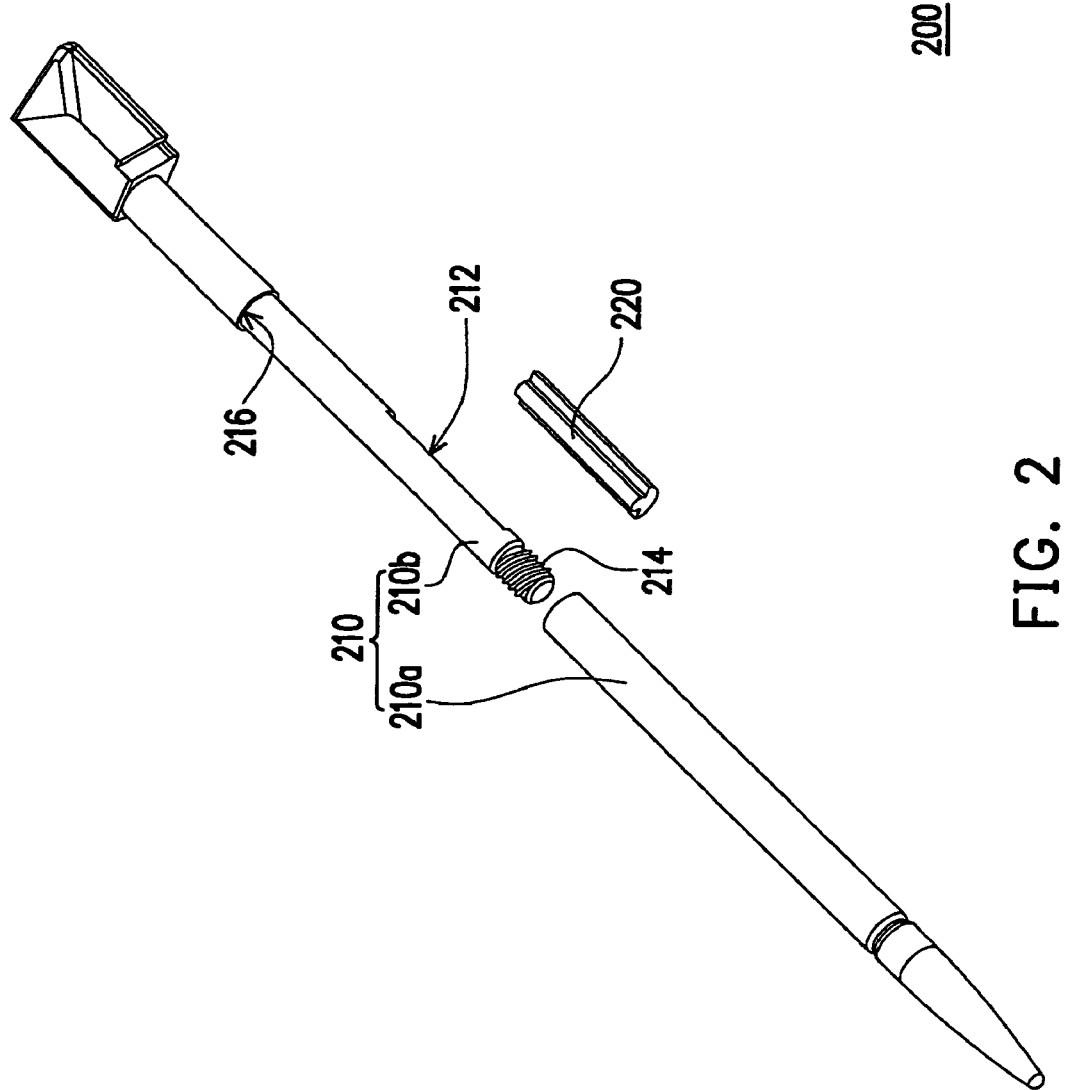
FIG. 2 is an exploded view of a stylus as shown in FIG. 1.
Figure 3:
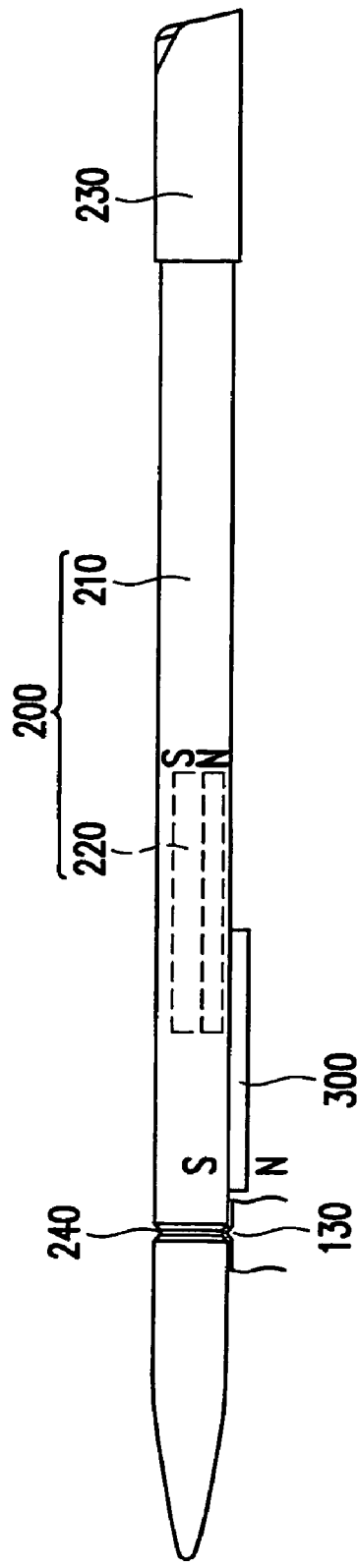
FIG. 3 is a schematic diagram illustrating the stylus as shown in FIG. 1, wherein the stylus is located at a threshold position after being inserted into a containing slot.

FIG. 1 is a perspective view of a handheld electronic device according to an embodiment of the present invention. FIG. 2 is an exploded view of a stylus as shown in FIG. 1. FIG. 3 is a schematic diagram illustrating the stylus as shown in FIG. 1, wherein the stylus is located at a threshold position after being inserted into a containing slot. In the following embodiments, the handheld electronic device may be a mobile phone, a smart phone or a PDA. Moreover, a portion of the handheld electronic device is not shown in FIG. 1, so as to clearly illustrate a position of a first magnetic member, and only a first position-limiting portion of a main body is illustrated in FIG. 3, so as to clearly illustrate relative positions among the stylus, the first position-limiting portion, the first magnetic member and a second magnetic member.

In addition, in other embodiments of the present invention, the handheld electronic device may also be a UMPC, a tablet PC, a pocket PC or other handheld electronic devices having a stylus.

Referring to FIG. 1, the handheld electronic device 10 includes a main body 100, a stylus 200 and a first magnetic member 300. The main body 100 has a containing slot 110. The stylus 200 is suitable for being inserted into the containing slot 110 and includes a stylus body 210 and a second magnetic member 220. Moreover, each of the first magnetic member 300 and the second magnetic member 220 can be a permanent magnet having an S pole and an N pole. The first magnetic member 300 is disposed at one side of the containing slot 110, wherein the S pole of the first magnetic member 300 faces towards the containing slot 110, and the N pole thereof faces oppositely. Moreover, the second magnetic member 220 is disposed to the stylus main body 210. When the stylus 200 is kept within the containing slot 110, the S pole of the second magnetic member 220 may be located adjacent to the first magnetic member 300, and the N pole of the second magnetic member 220 is located apart from the first magnetic member 300.

In addition, in another embodiment of the present invention, material of one of the first magnetic member 300 and the second magnetic member 220 may be diamagnetic material, paramagnetic material or ferromagnetic material. Moreover, if the material of one of the first magnetic member 300 and the second magnetic member 220 is the ferromagnetic material, the material of the ferromagnetic material includes at least one of iron, cobalt, nickel and samarium.

Referring to FIG. 2, in the present embodiment, the stylus body 210 includes a first part 210a and a second part 210b, and the second part 210b has an assembling slot 212 and a thread 214. Material of tip of the first part 210a may be plastic, and the material of the other part of the first part 210a may be aluminium. The material of the second part 210b may be plastic. Therefore, the stylus body 210 may present a metallic luster. In the present embodiment, the second magnetic member 220 is first disposed within the assembling slot 212 of the second part 210b, and then the second part 210b is assembled to the first part 210a via the thread 214 to form the stylus 200. Now, the other end of the first part 210a, which is located apart from the tip of the first part 210a leans against a position-limiting portion 216 of the second part 210a, so that joint of the first part 210a and the second part 210b has no obvious height difference in appearance after the first part 210a and the second part 210b are assembled. Moreover, in case the material of the first part 210a and the second part 210b is plastic, the first part 210a and the second part 210b may be integrally formed by injection molding so that the second magnetic member 220 may be directly embedded within the second part 210b.

Referring to FIG. 1 again, when the stylus 200 is located outside the containing slot 110, the stylus 200 may be inserted into the containing slot 110 from an opening of the containing slot 110 along a first direction 400. Moreover, when the first magnetic member 300 and the second magnetic 220 is close enough to enable a magnetic attraction there between, the S pole of the first magnetic member 300 attracts the N pole of the second magnetic member 220 due to the magnetic force. Now, the stylus 200 may be moved towards the containing slot 110 due to the magnetic force, until the stylus 200 is totally contained within the containing slot 110. In other words, when the stylus 200 is inserted into the containing slot 110 for a predetermined distance, the stylus 200 may be sliding into the containing slot 110 automatically and fixed therein. Moreover, the S pole of the first magnetic member 300 may attract the N pole of the second magnetic member 220 due to the magnetic force, so as to keep the stylus 200 within the containing slot 110.

Based on the above embodiment, the stylus 200 may be kept within the containing slot 110 due to the magnetic force generated by the first magnetic member 300 and the second magnetic member 220, so as to substitute a lock-in structure of the conventional technique. Therefore, the present invention may solve the problem that the stylus 200 cannot be stably kept within the containing slot 110 due to worn out and malfunction of the conventional lock-in structure after a long time utilization. Moreover, as the stylus 200 may be sliding into the containing slot 110 automatically, utilization fun thereof is improved.

In addition, when the stylus 200 is totally sliding into the containing slot 110 due to the magnetic force, a head portion 230 at the end of the second part 210b may lean against a blocker 120a located at the opening of the containing slot 110, and meanwhile an impact sound is occurred. Now, according to the impact sound, the stylus 200 can be judged to be located at a threshold position after being inserted into the containing slot 110.

Next, referring to FIG. 1 and FIG. 3, to further guarantee that the stylus may be stably locked in the main body 100, the main body 100 may further have a first position-limiting portion 130, and the stylus body 210 may further have a second position-limiting portion 240. The first position-limiting portion 130 may be a protrusion located within the containing slot 110, and the second position-limiting portion 240 may be a groove formed at side surface of the stylus body 210. As shown in FIG. 3, when the stylus 200 is totally contained within the containing slot 110, the first position-limiting portion 130 may be interfered with the second position-limiting portion 240, so that the stylus 200 may be more stably kept within the containing slot 110.

It should be noted that in the embodiment of FIG. 3, when the stylus 200 is totally contained within the containing slot 110, the first magnetic member 300 may be misaligned with the second magnetic member 220. Namely, position of the first magnetic member 300 does not totally correspond to the position of the second magnetic member 220. Now, center of the first magnetic member 300 may correspond to a position between center of the second magnetic member 220 and the tip of the stylus 200. Therefore, the S pole of the first magnetic member 300 and the N pole of the second magnetic member 220 may maintain an attractive state continuously, such that the stylus 200 may be stably kept within the containing slot 110.

Figure 4:
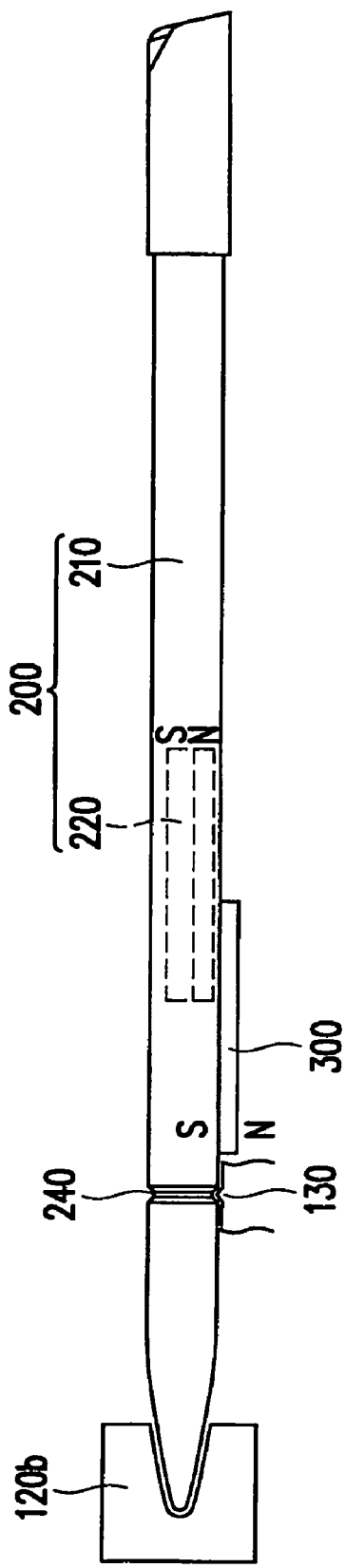
FIG. 4 is a schematic diagram illustrating the stylus as shown in FIG. 1, wherein the stylus is located at a threshold position after being inserted into a containing slot according to another embodiment of the present invention.

FIG. 4 is a schematic diagram illustrating the stylus as shown in FIG. 1, wherein the stylus is located at a threshold position after being inserted into a containing slot according to another embodiment of the present invention. It should be noted that only the first position-limiting portion of the main body and the blocker located at the end of the containing slot are illustrated, so as to clearly illustrate relative positions among the stylus, the first position-limiting portion, the blocker, the first magnetic member and the second magnetic member.

Referring to FIG. 4, in the present embodiment, the main body (not shown in FIG. 4) further has another blocker 120b. The blocker 120b may be disposed at the end of the containing slot (not shown in FIG. 4), and a shape thereof approximately corresponds to the shape of the tip of the stylus 200. When the stylus 200 is totally contained within the containing slot, the tip of the stylus 200 leans against the blocker 120b, so as to limit a threshold position of the stylus 200 after the stylus being inserted into the containing slot. Similarly, when the tip of the stylus 200 leans against the blocker 120b, an impact sound is occurred, and according to the impact sound, the stylus 200 can be judged to be located at a threshold position after being inserted into the containing slot.

In addition, the S pole of the first magnetic member 300 may attract the N pole of the second magnetic member 220 due to the magnetic force there between, so as to keep the stylus 200 within the containing slot 110. Therefore, the present invention may solve the problem that the stylus 200 cannot be stably kept within the containing slot due to worn out and malfunction of the conventional lock-in structure after a long time utilization. Moreover, the stylus 200 may further be stably kept within the containing slot 110 via interference between the first position-limiting portion 130 and the second position-limiting portion 240.

In summary, in the present invention, the stylus is kept within the containing slot via the magnetic force generated by the first magnetic member and the second magnetic member, so as to substitute the lock-in structure of the conventional technique. Therefore, the present invention may solve the problem that the stylus cannot be stably kept within the containing slot due to worn out and malfunction of the conventional lock-in structure after a long time utilization.

Moreover, when the first magnetic member and the second magnetic member are close enough to generate the magnetic force there between, the first magnetic member may attract the second magnetic member via the magnetic force, so that the stylus may move towards the containing slot automatically until the stylus is totally contained within the containing slot. Now, according to the impact sound generated when the stylus leans against the blocker, the stylus can be judged to be located at the threshold position after being inserted into the containing slot.

Moreover, when the stylus is totally contained within the containing slot, the position of the first magnetic member may be misaligned with the position of the second magnetic member, such that the first magnetic member and the second magnetic member may maintain the attractive state continuously, so as to stably keep the stylus within the containing slot.

In addition, in the present invention, not only the blocker may be applied for limiting the threshold position of the stylus after the stylus being inserted into the containing slot, but also the stylus may further be stably kept within the containing slot via interference between the first position-limiting portion and the second position-limiting portion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
   a main body having a containing slot having an entrance, an end, and a sidewall connected between the entrance and the end;
   a first magnetic member disposed on the sidewall of the containing slot; and
   a stylus suitable for being inserted into the containing slot through the entrance, wherein the stylus comprises:
      a stylus body; and
      a second magnetic member disposed on the stylus body or embedded in the stylus body, wherein when the stylus is contained within the containing slot, the stylus is kept within the containing slot due to a magnetic attractive force generated between the first magnetic member and the second magnetic member,
   wherein when the stylus is contained within the containing slot, the first magnetic member is misaligned with the second magnetic member, such that a center of the first magnetic member corresponds to a position between a center of the second magnetic member and a tip of the stylus;
   one of the first magnetic member and the second magnetic member is a permanent magnet, and the other one of the first magnetic member and the second magnetic member is a permanent magnet or is composed of magnetic material; and
   the permanent magnet has an S pole and an N pole, and the S pole and the N pole are arranged along a pole direction substantially perpendicular to a longitudinal direction of the stylus.

2. The handheld electronic device as claimed in claim 1, wherein the main body has a first position-limiting portion, and the stylus body has a second position-limiting portion, and when the stylus is contained within the containing slot, the first position-limiting portion interferes with the second position-limiting portion.

3. The handheld electronic device as claimed in claim 2, wherein the first position-limiting portion is located within the containing slot, and the second position-limiting portion is located at side surface of the stylus body.

4. The handheld electronic device as claimed in claim 3, wherein the first position-limiting portion is a protrusion, and the second position-limiting portion is a groove.

5. The handheld electronic device as claimed in claim 1, wherein the main body further comprises a blocker disposed at end of the containing slot for limiting a threshold position of the stylus after the stylus being inserted into the containing slot.

6. The handheld electronic device as claimed in claim 1, wherein the magnetic material comprises diamagnetic material, paramagnetic material and ferromagnetic material.

7. The handheld electronic device as claimed in claim 6, wherein material of the ferromagnetic material comprises at least one of iron, cobalt, nickel and samarium.

8. A stylus suitable for being inserted into a containing slot of a handheld electronic device, wherein the containing slot has an entrance, an end, and a sidewall connected between the entrance and the end, and the handheld electronic device has a first magnetic member disposed on the sidewall of the containing slot, the stylus comprising:
   a stylus body; and
   a second magnetic member, disposed on the stylus body or embedded in the stylus body, wherein when the stylus is contained within the containing slot, the stylus is kept within the containing slot due to a magnetic attractive force generated between the first magnetic member and the second magnetic member,
   wherein when the stylus is contained within the containing slot, the first magnetic member is misaligned with the second magnetic member, such that a center of the first magnetic member corresponds to a position between a center of the second magnetic member and a tip of the stylus;
   one of the first magnetic member and the second magnetic member is a permanent magnet, and the other one of the first magnetic member and the second magnetic member is a permanent magnet or is composed of magnetic material; and
   the permanent magnet has an S pole and an N pole, and the S pole and the N pole are arranged along a pole direction substantially perpendicular to a longitudinal direction of the stylus.

9. The stylus as claimed in claim 8, wherein the stylus body comprises:
   a first part; and
   a second part, assembled to the first part, wherein the second part has an assembling slot, and the second magnetic member is disposed within the assembling slot.

10. The stylus as claimed in claim 9, wherein one end of the second part has a head portion, and the other end of the second part has a thread.

11. The stylus as claimed in claim 8, wherein the magnetic material comprises diamagnetic material, paramagnetic material and ferromagnetic material.

12. The stylus as claimed in claim 11, wherein material of the ferromagnetic material comprises at least one of iron, cobalt, nickel and samarium.

* * * * *